(12) United States Patent
Zhang et al.

(10) Patent No.: US 12,449,339 B2
(45) Date of Patent: *Oct. 21, 2025

(54) DEVICE AND METHOD FOR TESTING GAS LOSS AMOUNT WHICH SIMULATES WIRELINE CORING PROCESS

(71) Applicants: CHINA UNIVERSITY OF PETROLEUM(EAST CHINA), Shandong (CN); NO.1 EXPLORATION BRIGADE OF SHANDONG COAL GEOLOGY BUREAU, Shandong (CN)

(72) Inventors: Xianmin Zhang, Qingdao (CN); Qihong Feng, Qingdao (CN); Zhuangzhuang Zheng, Qingdao (CN); Baiyanyue Chen, Qingdao (CN); Changlong Zhang, Qingdao (CN); Bin Zhang, Qingdao (CN)

(73) Assignees: CHINA UNIVERSITY OF PETROLEUM(EAST CHINA), Qingdao (CN); NO.1 EXPLORATION BRIGADE OF SHANDONG COAL GEOLOGY BUREAU, Qingdao (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/981,470

(22) Filed: Dec. 14, 2024

(65) Prior Publication Data

US 2025/0123257 A1 Apr. 17, 2025

Related U.S. Application Data

(63) Continuation of application No. 18/566,659, filed as application No. PCT/CN2023/084992 on Mar. 30, 2023.

(30) Foreign Application Priority Data

Dec. 16, 2022 (CN) .............................. 202211617118

(51) Int. Cl.
*G01N 7/16* (2006.01)
*G01N 15/08* (2006.01)
*G01N 33/24* (2006.01)

(52) U.S. Cl.
CPC ........... *G01N 7/16* (2013.01); *G01N 15/0806* (2013.01); *G01N 33/241* (2013.01)

(58) Field of Classification Search
CPC ..... G01N 15/0806; G01N 33/241; G01N 7/16
(Continued)

(56) References Cited

U.S. PATENT DOCUMENTS 5,741,959 A * 4/1998 Garcia, Jr. ................ G01N 7/14
73/19.05
9,790,743 B2 * 10/2017 Li ............................ E21B 34/00
(Continued)

FOREIGN PATENT DOCUMENTS

CN 104863579 B 8/2015
CN 105675434 B 6/2016
(Continued)

*Primary Examiner* — John Fitzgerald
(74) *Attorney, Agent, or Firm* — Maschoff Brennan

(57) ABSTRACT

The present invention discloses a device and method for testing the gas loss amount which simulates a wireline coring process, and belongs to the field of petroleum engineering. The device includes: a programmable temperature control thermostat for simulating temperature changes in a wireline coring process, a simulated center pipe body for constructing a simulated environment of the center pipe body being filled with drilling fluid or clean water, a simulated coring barrel for drilling for and retaining a core sample, a gas injection control and recovery device, a liquid injection control and recovery device, and a drainage and
(Continued)

gas collection meter. The present invention has advantages as follows: it is simple to implement and can reproduce a real drilling and coring process to a certain extent; the simulation of the coordinated changes in liquid pressure and temperature environment experienced by the core sample lifted to a wellhead from a drilling bottom hole through the programmable temperature control thermostat and a program-controlled constant pressure valve, can truly reproduce the environmental conditions of a wireline coring barrel being filled with drilling fluid and the loss changes in gas content of the core sample with the coordinated descents in liquid-phase pressure and temperature in the liquid-phase filling environment in the core lift process.

6 Claims, 1 Drawing Sheet

(58) Field of Classification Search
USPC .......................................... 73/152.07, 152.11
See application file for complete search history.

(56) References Cited

U.S. PATENT DOCUMENTS

| | | | |
|---|---|---|---|
| 2016/0305205 A1* | 10/2016 | Li | ........................... E21B 34/00 |
| 2020/0240973 A1 | 7/2020 | Xu et al. | |

FOREIGN PATENT DOCUMENTS

| | | | | |
|---|---|---|---|---|
| CN | 106370260 B | 2/2017 | | |
| CN | 110735635 B | 1/2020 | | |
| WO | WO-2019226149 A1 * | 11/2019 | ............. | E21B 25/00 |

* cited by examiner

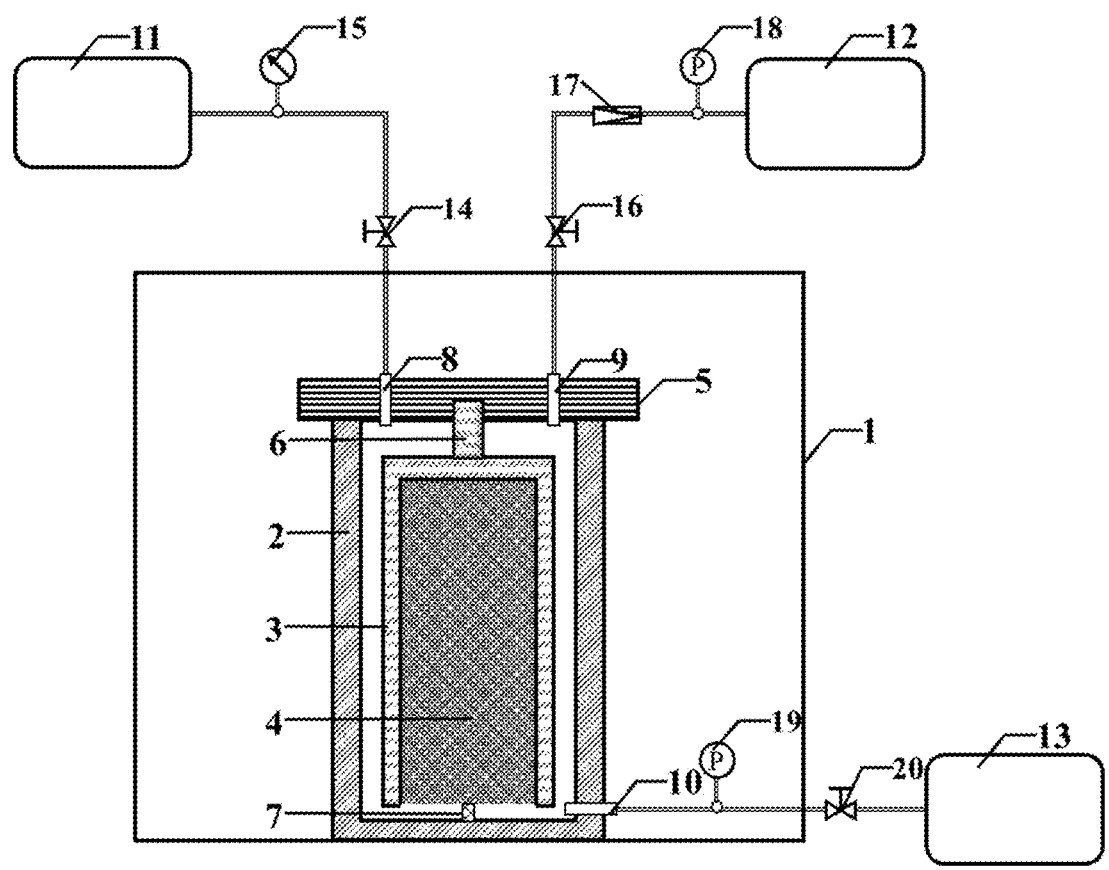

_US 12,449,339 B2_

DEVICE AND METHOD FOR TESTING GAS LOSS AMOUNT WHICH SIMULATES WIRELINE CORING PROCESS

TECHNICAL FIELD

The present invention belongs to the field of petroleum engineering and relates to a device and method for testing the gas loss amount which simulates a wireline coring process.

BACKGROUND ART

Gas content is a key parameter for determining the amount of resources in unconventional natural gas exploration and development, and is also the basis for evaluating the development potential of unconventional natural gas. Since a considerable part of unconventional natural gas exists in the form of adsorbed gas, unconventional natural gas reserves cannot be determined simply by measuring effective pore volumes, but must be tested through on-site gas content experiments. According to the standards of GB/T 19559-2008 "Device for Determining Coalbed Gas Content" and SY/T6940-2013 "Device for Determining Shale Gas Content", the on-site gas content consists of three parts: the gas loss amount, the desorption gas amount and the residual gas amount. Both the desorption gas amount and the residual gas amount can be measured directly through experiments, and the gas loss amount is generally estimated using the direct method proposed by the United States Bureau of Mines (USBM). The gas loss amount is the part with large errors in the desorption method, and the calculation for recovering the gas loss amount has always been a hot research topic among domestic and foreign scholars.

In a real wireline coring and lifting process, a core has been in an environment of drilling fluid filling before arriving at a wellhead. Under the constraint of the filling liquid phase pressure, liquid can prevent gas from escaping from the core to a certain extent. Only by breaking through mixing effects of constraints of gaseous media, porous media, and liquid phase around the core and the like, can the gas occurring in the core escape from the core and enter the filling liquid phase inside the pipe; under the action of buoyancy; it will gather in the form of small bubbles and float up to the wellhead to be lost. Simultaneously, in the lifting process from a bottom hole to a wellhead, the environment temperature decreases synchronously with pressure, which will also inhibit the continuous escape of gas in the core to a certain extent.

The invention patent with Document Number CN105675434B discloses a system and device for measuring the gas content, and the device is used to measure the gas loss amount and desorption gas content in a sample based on the idea of temperature and pressure traceback. The invention patent with Authorized Announcement Number CN10515811B discloses an experimental device for measuring the gas loss amounts in a high-speed gas injection process using large-size cores, which can quickly determine the gas loss amounts in different cores at different gas injection rates and at changing gas injection rates, as well as the gas loss amounts in the same core at different injection-production cycles. The invention patent with Document Number CN104863579B discloses a device and system for measuring the gas loss amount, which is suitable for the direct measurement of the gas loss amounts with different lithology, different drilling well models, and different core diameters. The invention patent with Document Number CN104863579B discloses a device for determining the gas loss amount of gas content in shale; the device plots the gas content fitting curve of desorption gas with the square root of the obtained desorption time as the abscissa and with the gas content of the obtained desorption gas as the ordinate, and the ordinate intercept value of the fitting curve is the gas loss amount. The invention patent with Document Number CN106370260B discloses a device for measuring the gas loss amount in testing gas content in shale, which calculates respectively the gas loss amounts in the process from pulling out of hole to a core sample arriving at a wellhead and in the process from the core sample arriving at the wellhead to its arriving at a sealed container. The invention patent with Document Number CN110927359B discloses an experimental device and method for testing the gas loss amount in a coring process of low-permeability porous media; the device uses a double-tank supporting water bath constant temperature system, where, after balancing through inflation compensation, temperature recovery, and pressure rise to a reservoir pressure, etc., the free space volume is calibrated through reference tanks, and a coring process in shale is simulated through gas pressure changes inside free space around the core, so that the gas loss amount is acquired using gas compressibility, pressure reducing valves and other means. The invention patent with Document Number CN110735635B discloses a device for determining the gas loss amount in testing gas content in shale, which calculates the gas loss amount based on fitting parameters determined from desorption data and the corrected time required to obtain a shale core. The above existing technologies have the significant shortcomings as follows. None can truly reproduce the destructive effects of the drilling and coring process on cores, nor can they truly reproduce the constraint environment of liquid-phase filling inside a coring barrel, and changes in the gas loss amount in a core sample with the coordinated descents of liquid phase pressure and temperature in the coring and lifting process, so that it is difficult to accurately measure the gas loss amount and the gas loss ratio in drilling and core lift process, with the calculated gas loss amount too large, which may mislead exploration and development workers' judgment of unconventional natural gas exploration and development potential.

SUMMARY OF THE INVENTION

The present invention aims to overcome the above shortcomings and provide a device and method for testing the gas loss amount which simulates a wireline coring process, which solves the technical problems that previous devices for testing the gas loss amount cannot truly reproduce changes in key element conditions in wireline coring and lifting processes.

To achieve the above objects, the present invention adopts the technical solution as follows. A device for testing the gas loss amount which simulates a wireline coring process, characterized in that the device includes:

a programmable temperature control thermostat, which is used to simulate temperature changes in a wireline coring process;

a simulated center pipe body, which is used to construct a simulated environment of the center pipe body being filled with drilling fluid or clean water;

a simulated coring barrel, which is used to drill for and retain a core sample and is provided at its bottom with a connecting rod and an elastic supporting body; wherein the connecting rod is used to simulate the actual state of the coring barrel being hung and lifted, and the elastic supporting body is used to support and fix the core sample inside the simulated coring barrel;

a gas injection control and recovery device, which is used for gas injection, pressurization and vacuuming inside the simulated center pipe body;

a liquid injection control and recovery device, which is used to inject water or simulated drilling fluid into the simulated center pipe body to construct a simulated drilling fluid or clean water environment inside the simulated center pipe body, and is used to remove and recover the remaining liquid from the simulated center pipe body after the simulation is completed; and a drainage and gas collection meter, which is used to meter the drainage and gas collection of the gas-water mixed fluid discharged from the simulated center pipe body.

Further, the simulated center pipe body is provided with a sealing cover body which is provided with a gas injection pipe hole and a liquid outlet pipe hole respectively, the sealing cover body is connected to the connecting rod, and the simulated center pipe body is provided with a drainage pipe hole at its bottom.

Further, the simulated coring barrel adopts a diamond water drill coring bit with a certain inner diameter and outer diameter.

Further, the gas injection control and recovery device is connected to a gas injection valve through a first pipeline, and the first pipeline is provided with a high-precision gas mass flow meter, which is used to meter the cumulative gas injection amount into the simulated center pipe body.

Further, the drainage and gas collection meter is connected to a program-controlled constant pressure valve through a second pipeline, and the second pipeline is provided with a first high-precision pressure gauge, which is used to monitor the outlet fluid pressure.

Further, the drainage pipe hole is connected to a liquid injection valve through a third pipeline, and the third pipeline is provided with a second high-precision pressure gauge, which is used to monitor changes in fluid pressure inside the simulated center pipe body in real time.

Another object of the present invention is to provide a method for testing the gas loss amount which simulates a wireline coring process, characterized in that the method comprises the following steps:

providing a programmable temperature control thermostat, for simulating temperature changes in a wireline coring process; providing a simulated center pipe body, for constructing a simulated environment of the center pipe body being filled with drilling fluid or clean water;

providing a simulated coring barrel, for drilling for and retaining a core sample, wherein the simulated coring barrel is provided with a connecting rod and an elastic supporting body at its bottom, the connecting rod is used to simulate the actual state of the coring barrel being hung and lifted, and the elastic supporting body is used to support and fix the core sample inside the simulated coring barrel;

providing a gas injection control and recovery device, for gas injection, pressurization and vacuuming inside the simulated center pipe body; providing a liquid injection control and recovery device, for injecting water or simulated drilling fluid into the simulated center pipe body to construct a simulated drilling fluid or clean water environment inside the simulated center pipe body, and for removing and recovering the remaining liquid from the simulated center pipe body after the simulation is completed; providing a drainage and gas collection meter, for metering the drainage and gas collection of the gas-water mixed fluid discharged from the simulated center pipe body;

determining a reservoir pressure, a reservoir temperature, a drilling and coring depth, a bottom hole pressure, a bottom hole temperature and a core lift time, based on existing geological evaluation data;

selecting a large rock sample to drill for a core sample and performing a gas tightness check of the testing device;

constructing a simulated liquid-phase filling environment before the wireline coring to determine the total occurrence amount of methane gas in the core sample;

simulating the coordinated change process of liquid-phase pressure and temperature in lifting the core to a wellhead, to calculate the gas loss amount and the gas loss ratio in a simulated process of the core sample arriving at the wellhead.

Further, the step of selecting a large rock sample to drill for a core sample and performing a gas tightness check of the testing device, comprises the following steps:

selecting a large rock sample, using the simulated coring barrel to drill into the large rock sample for the core sample, and then retaining the core sample in the simulated coring barrel, and placing the simulated coring barrel into the simulated center pipe body; and turning on the programmable temperature control thermostat, setting a test temperature to the reservoir temperature level, turning on the gas injection control and recovery device to inject helium gas into the simulated center pipe body at a pressure level 1 to 2 MPa higher than the reservoir pressure, and turning off the gas injection control and recovery device with standing for 12 to 24 hours, and checking the gas tightness of the testing device.

Further, the step of constructing a simulated liquid-phase filling environment before the wireline coring to determine the total occurrence amount of methane gas in the core sample, comprises the following steps:

turning on the gas injection control and recovery device to continuously vacuum the testing device for 6 to 12 hours;

injecting methane gas into the simulated center pipe body at a constant pressure through the gas injection control and recovery device, and then, turning off the gas injection control and recovery device to determine the cumulative methane gas injection amount and the balanced system pressure; starting the liquid injection control and recovery device to inject simulated formation water into the simulated center pipe body at a constant low injection rate, and recording pressure changes inside the simulated center pipe body;

setting the test temperature of the programmable temperature control thermostat to the bottom hole temperature, setting the pressure level of the program-controlled constant pressure valve to the bottom hole pressure, the liquid injection control and recovery device continuing to inject the simulated drilling fluid into the simulated center pipe body at a constant pressure higher than the bottom hole pressure, separately metering the cumulative discharge amount of methane gas through the drainage and gas collection meter, and determining that the core sample inside the simulated center pipe body reaches the underground temperature and pressure conditions and the occurrence state during drilling and coring in the environment of the pipe body being filled with drilling fluid; and turning off the drainage and gas collection meter, the liquid injection control and recovery device to calculate the total occurrence amount of methane gas in the core sample.

Further, the step of simulating the coordinated change process of liquid-phase pressure and temperature in lifting the core to a wellhead, to calculate the gas loss amount and the gas loss ratio in a simulated process of the core sample arriving at the wellhead, comprises the following steps:

setting the automatic descent path of a simulated lift pressure from the bottom hole pressure to a wellhead pressure and the synchronous automatic descent path of a simulated temperature from the bottom hole temperature to a wellhead temperature, according to the core lift time;

adjusting the liquid outlet pressure level according to the set descent path of the simulated lift pressure, adjusting the temperature level inside the simulated center pipe body according to the set synchronous automatic descent path of the temperature, to reproduce dynamic changes in pressure and temperature conditions inside the coring barrel during the wireline coring and lifting process; separately metering changes in the total amount of discharged methane gas with time through the drainage and gas collection meter, and recording the total amount of discharged methane gas separately metered by the drainage and gas collection meter, to calculate the gas loss amount and the gas loss ratio in a simulated process of the core sample arriving at the wellhead.

The present invention has beneficial effects as follows.

First, the device has a simple structure. The core sample for which to drill directly into a large original sample, is directly adopted, reproducing the real drilling and coring process to a certain extent. The simulation of the coordinated changes in liquid pressure and temperature environment experienced by the core sample lifted to the wellhead from the drilling bottom hole through the programmable temperature control thermostat and the program-controlled constant pressure valve, can truly reproduce the environmental conditions of the wireline coring barrel being filled with the drilling fluid and the loss changes in gas content of the core sample with the coordinated descents in liquid-phase pressure and temperature in the liquid-phase filling environment in the core lift process.

Second, the operation is easy to implement, and the device for testing the gas loss amount which simulates a wireline coring process, is simple in structure and reliable in data collection. The testing device can more truly reproduce the saturated water occurrence process in underground gas reservoirs and the liquid-phase filling environment in which the core sample is during the core lift process, and can reveal the change law of the gas loss amount in the core sample with the coordinated descents of liquid-phase pressure and temperature in the real liquid-phase filling environment, thus achieving the accurate measurement of the gas loss amount and the gas loss ratio in the drilling and core lift process.

BRIEF DESCRIPTION OF THE DRAWINGS

The accompanying drawings described herein are used to provide a further understanding of the present application and constitute a part of the present application. The illustrative embodiments of the present application and their descriptions are used to explain the present application and do not constitute an improper limitation of the present application. In the accompanying drawings:

FIG. 1 is a schematic structural diagram of a device for testing the gas loss amount which simulates a wireline coring process, of the present invention.

DESCRIPTION OF REFERENCE NUMERALS

1—programmable temperature control thermostat; 2—simulated center pipe body; 3—simulated coring barrel; 4—core sample;
5—sealing cover body; 6—connecting rod; 7—elastic supporting body; 8—gas injection pipe hole; 9—liquid outlet pipe hole;
10—drainage pipe hole; 11—gas injection control and recovery device; 12—drainage and gas collection meter;
13—liquid injection control and recovery device; 14—gas injection valve; 15—high-precision gas mass flow meter;
16—liquid outlet valve; 17—program-controlled constant pressure valve; 18—first high-precision pressure gauge; 19—second high-precision pressure gauge;
20—liquid injection valve.

DETAILED DESCRIPTION OF THE INVENTION

For those skilled in the art to better understand technical solutions of the present invention, the present invention will be further described in detail below in conjunction with the accompanying drawings and specific embodiments.

The accompanying drawings are only for illustrative purposes and only represent schematic diagrams rather than actual drawings, and cannot be understood as limitations of the present invention; to better illustrate the embodiments of the present invention, some components in the drawings will be omitted, enlarged or reduced, whose sizes do not represent sizes of actual products; it is understandable by those skilled in the art that some well-known structures and their illustrations may be omitted in the accompanying drawings.

The same or similar numbers in the accompanying drawings of the present invention correspond to the same or similar components; in the description of the present invention, it should be understood that if the terms "upper", "lower", "left", "right", "inside" and "outside", etc., indicate the orientation or position relationships which are those indicated based on the accompanying drawings, it is only for the convenience and simplification of describing the present invention, rather than indicating or implying the devices or components referred to must have specific orientations—be constructed and operated in specific orientations. Therefore, the terms describing position relationships in the accompanying drawings are only for illustrative purposes and should not be construed as limitations of the present invention. It is possible for those skilled in the art to understand the specific meanings of the above terms according to specific situations.

In the description of the present invention, unless otherwise explicitly stipulated and limited, if the term "connection" and other terms indicate connection relationships between components, the terms should be understood in a broad sense. For example, they can be a fixed connection, a detachable connection, or an integral connection; they can be a mechanical connection or an electrical connection; they can be a direct connection or an indirect connection through an intermediate medium; they can be an internal communication between two components or an interaction between two components. It is possible for those skilled in the art to understand the specific meanings of the above terms in the present invention according to specific situations.

According to one aspect of embodiments of the present invention, referring to FIG. 1, a device for testing the gas loss amount which simulates a wireline coring process, of the present invention includes: a programmable temperature control thermostat 1, a simulated center pipe body 2, and a simulated coring barrel 3, a gas injection control and recovery device 11, a drainage and gas collection meter 12, and a liquid injection control and recovery device 13. The programmable temperature control thermostat 1 is used to test the automatic control of environment temperature; the simulated center pipe body 2 is used to construct a simulated environment of the center pipe body being filled with clean water or drilling fluid; and, the simulated coring barrel 3 adopts a diamond water drill coring bit with a certain inner diameter and outer diameter, for drilling for and retaining a core sample 4. The gas injection control and recovery device 11 is used to simulate gas injection, pressurization and vacuuming in the center pipe body 2, which belongs to the existing technology and will not be described in detail. The drainage and gas collection meter 12 is used to meter the drainage and gas collection of the gas-water mixed fluid discharged from the simulated center pipe body 2, which belongs to the existing technology and will not be described in detail.

In an embodiment of the present application, specifically, the simulated center pipe body 2 is provided with a sealing cover body 5 to realize the sealing of the internal space of the simulated center pipe body 2; the simulated coring barrel 3 is provided with a connecting rod 6 at its bottom, and the connecting rod 6 is connected to the sealing cover body 5 for simulating the actual state of the coring barrel being hung and lifted; the simulated center pipe body 2 is provided with an elastic supporting body 7 at its bottom, for supporting and fixing the core sample 4 inside the simulated coring barrel 3; the simulated center pipe body 2 is provided with a drainage pipe hole 10 at its bottom; and, the sealing cover body 5 is provided with an gas injection pipe hole 8 and a liquid outlet pipe hole 9 respectively.

In an embodiment of the present application, specifically, the gas injection control and recovery device 11, a gas injection valve 14, and the gas injection pipe hole 8 in the sealing cover body 5 are connected in sequence through pipelines. The connecting pipeline between the gas injection control and recovery device 11 and the gas valve 14 is provided with a high-precision gas mass flow meter 15, which is used to meter the cumulative gas injection amount into the simulated center pipe body 2.

In an embodiment of the present application, specifically; the drainage and gas collection meter 12 and a program-controlled constant pressure valve 17 are connected through a first pipeline, and the program-controlled constant pressure valve 17 is used to automatically control the discharge pressure in the filling liquid phase; the first pipeline between the drainage and gas collection meter 12 and the program-controlled constant pressure valve 17 is provided with a first high-precision pressure gauge 18, which is used to monitor the outlet fluid pressure; and, the program-controlled constant pressure valve 17, a liquid outlet valve 16, and the liquid outlet pipe hole 9 in the sealing cover body 5 are connected in sequence through pipelines.

In an embodiment of the present application, specifically; the liquid injection control and recovery device 13, a liquid injection valve 20, and the drainage pipe hole 10 at the bottom of the simulated center pipe body 2 are connected in sequence through second pipelines; the liquid injection control and recovery device 13 is used to inject water or simulated drilling fluid into the simulated center pipe body 2 to construct a simulated drilling fluid or clean water environment inside the center pipe body, and is used to remove and recover the remaining liquid from the simulated center pipe body 2 after the simulation is completed; the second pipeline between the drainage pipe hole 10 and the liquid injection valve 20 is provided with a second high-precision pressure gauge 19, which is used to monitor changes in fluid pressure inside the simulated center pipe body 2 in real time.

According to another aspect of the embodiments of the present invention, a method for testing the gas loss amount which simulates a wireline coring process, of the present invention, specifically comprises the following steps.

S1: A reservoir pressure $P_0$, a reservoir temperature $T_0$, a drilling and coring depth H, a bottom hole pressure $P_w$, a bottom hole temperature $T_w$, and a core lift time T are determined based on existing geological evaluation data.

S2: A large rock sample is selected to drill for the core sample, and a gas tightness check of the testing device is performed. As a specific embodiment, the step specifically comprises the following sub-steps.

S21: A large rock sample is selected whose length, width and height all are greater than 15 cm, the simulated coring barrel 3 is used to drill into the large rock sample for the core sample 4, and then, the core sample 4 is retained in the simulated coring barrel 3, and the simulated coring barrel 3 is placed into the simulated center pipe body 2, so that the connecting rod 6 at the bottom of the simulated coring barrel 3 is connected to the sealing cover body 5, and the core sample 4 inside the suspended inverted simulated coring barrel 3 is in contact with the elastic supporting body 7 at the bottom of the simulated center pipe body 2; and, the sealing cover body 5 is used to seal the simulated center pipe body 2 and the pipelines are connected.

S22: The programmable temperature control thermostat 1 is turned on, a test temperature is set to a level of the reservoir temperature $T_0$, the liquid outlet valve 16 and the liquid injection valve 20 are turned off, the gas injection valve 14 and the gas injection control and recovery device 11 are turned on for the gas injection control and recovery device 11 to inject helium gas into the simulated center pipe body 2 at a pressure level 1 to 2 MPa higher than the reservoir pressure; the gas injection valve 14 and the gas injection control and recovery device 11 are turned off, standing for 12 to 24 hours, and then the gas tightness of the testing device is checked.

S3: A simulated environment of liquid-phase filling before the wireline coring is constructed to determine the total occurrence amount of methane gas in the core sample. As a specific embodiment, the step specifically comprises the following sub-steps.

S31: The gas injection valve 14 and the gas injection control and recovery device 11 are turned on for the gas injection control and recovery device 11 to continuously vacuum the testing device for 6 to 12 hours.

S32: After injecting methane gas into the simulated center pipe body 2 at a constant pressure $P_c$ through the gas injection control and recovery device 11, the gas injection valve 14 and the gas injection control and recovery device 11 are turned off; until the second high-precision pressure gauge 19 has been having a stable reading without change for 6 to 12 hours, readings of the high-precision gas mass flow meter 15 and the second high-precision pressure gauge 19 are recorded to determine the cumulative methane gas injection amount $C_{g1}$ and the balanced system pressure $P_1$.

S33: The liquid injection valve 20 is turned on, the liquid injection control and recovery device 13 is started to inject simulated formation water into the simulated center pipe body 2 at a constant low injection rate, and pressure changes inside the simulated center pipe body 2 are continuously recorded through the second high-precision pressure gauge 19; after the reading of the second high-precision pressure gauge 19 reaches the reservoir pressure $P_0$, the liquid injection control and recovery device 13 changes to continue to inject the simulated formation water into the simulated center pipe body 2 at the constant pressure $P_0$ until the reading of the second high-precision pressure gauge 19 does not change significantly within 12 to 24 hours.

S34: The test temperature of the programmable temperature control thermostat 1 is set to the bottom hole temperature $T_w$, the pressure level of the program-controlled constant pressure valve 17 is set to the bottom hole pressure $P_w$; and the liquid injection control and recovery device 13 changes to continue to inject the simulated drilling fluid into the simulated center pipe body 2 at a constant pressure higher than the bottom hole temperature $P_w$; the liquid outlet valve 16 is turned on to separately meter the cumulative methane gas discharge amount $C_{g2}$ through the drainage and gas collection meter 12; when the metered value of the cumulative methane gas discharge amount $C_{g2}$ has no significant change within 3 to 6 hours, it is considered that at this time the free gas has been completely discharged from the simulated center pipe body 2, and the core sample 4 inside the simulated center pipe body 2 reaches the underground temperature and pressure conditions and the occurrence state during drilling and coring in the environment of the pipe body being filled with drilling fluid.

S35: The liquid outlet valve 16, the liquid injection valve 20, the drainage and gas collection meter 12, and the liquid injection control and recovery device 13 are turned off; until the reading of the second high-precision pressure gauge 19 has no significant change within 12 to 24 hours, the total occurrence amount of methane gas in the core sample 4 is calculated with the following formula:

$$C_g = C_{g1} - C_{g2} \qquad (1)$$

where $C_g$ is the total occurrence amount of methane gas in the core sample, measured in cm³.

S4: The coordinated change process of liquid-phase pressure and temperature in lifting the core to a wellhead is simulated, to calculate the gas loss amount and the gas loss ratio in a simulated process of the core sample arriving at the wellhead. As a specific embodiment, the step specifically comprises the following sub-steps.

S41: The automatic descent path of a simulated lift pressure of the program-controlled constant pressure valve 17 from the bottom hole pressure $P_w$ to the wellhead pressure, and the synchronous automatic descent path of a simulated temperature of the programmable temperature control thermostat 1 from the bottom hole temperature $T_w$ to the wellhead temperature, are set according to the core lift time T.

S42: The liquid outlet valve 16 is turned on, the program-controlled constant pressure valve 17 automatically adjusts the liquid outlet pressure level of the liquid outlet pipe hole 9 according to the set descent path of the simulated lift pressure, and the programmable temperature control thermostat 1 automatically adjusts the temperature level in the simulated center pipe body 2 according to the set synchronous automatic descent path of temperature, thereby reproducing dynamic changes in pressure and temperature conditions inside the coring barrel in the wireline coring and lifting process; and then, the changes in fluid pressure at the liquid outlet with time are recorded through the first high-precision pressure gauge 18, the changes in fluid pressure inside the simulated center pipe body 2 with time are recorded through the second high-precision pressure gauge 19, and the changes in the total amount of discharged methane gas with time are separately metered through the drainage and gas collection meter 12, until the program-controlled constant pressure valve 17 and the programmable temperature control thermostat 1 synchronously reach the simulated wellhead pressure and wellhead temperature conditions, the total amount $C_{g3}$ of discharged methane gas separately metered by the drainage and gas collection meter 12, is recorded.

S43: The gas loss amount and the gas loss ratio in the simulated process of the core sample arriving at the wellhead, is calculated with the following formulas:

$$C_{gl} = C_{g3} - C_{g2} \qquad (2)$$

$$R_{gl} = \frac{C_{g3} - C_{g2}}{C_{g1} - C_{g2}} \qquad (3)$$

where $C_{gl}$ is the gas loss amount in the core sample, measured in cm³; $R_{gl}$ is the gas loss ratio in the core sample.

In experiments, the drilling and coring process, the liquid-phase filling environment in which the core sample is in the core lift process, and the coordinated changes in pressure and temperature conditions inside the center pipe body, can be truly reproduced by changing conditions such as the core sample type, injection water quality, experimental temperature and automatic pressure descent path, so that it is realized to accurately characterize the gas loss amount of gas content of the core sample with the coordinated changes in the lift pressure and temperature conditions in a real closed environment of liquid-phase filling, thus providing an experimental basis for the accurate determination of the gas content and the development and design of gas reservoirs.

The present invention has beneficial effects as follows.

First, the device has a simple structure. The core sample for which to drill directly into a large original sample, is directly adopted, reproducing the real drilling and coring process to a certain extent. The simulation of the coordinated changes in liquid pressure and temperature environment experienced by the core sample lifted to the wellhead from the drilling bottom hole through the programmable temperature control thermostat and the program-controlled constant pressure valve, can truly reproduce the environmental conditions of the wireline coring barrel being filled with the drilling fluid and the loss changes in gas content of the core sample with the coordinated descents in liquid-phase pressure and temperature in the liquid-phase filling environment in the core lift process.

Second, the operation is easy to implement, and the device for testing the gas loss amount which simulates a wireline coring process, is simple in structure and reliable in data collection. The testing device can more truly reproduce the saturated water occurrence process in underground gas reservoirs and the liquid-phase filling environment in which the core sample is during the core lift process, and can reveal the change law of the gas loss amount in the core sample with the coordinated descents of liquid-phase pressure and temperature in the real liquid-phase filling environment, thus achieving the accurate measurement of the gas loss amount and the gas loss ratio in the drilling and core lift process.

The above description shows and describes several preferred embodiments of the present application, but as described above, it should be understood that, the present application is not limited to the forms disclosed herein, and should not be regarded as excluding other embodiments, but can be used in various other combinations, modifications and environments, and can be modified through the above teachings or technologies or knowledge in related fields within the conception scope of the application described herein. Any modifications and changes made by those skilled in the art which do not deviate from the spirit and scope of the present application, shall fall within the protection scope of the appended claims of the present application.

The invention claimed is:

1. A method for testing the gas loss amount which simulates a wireline coring process, characterized in that the method comprises the following steps:

providing a programmable temperature control constant temperature module, for simulating temperature changes in a wireline coring process; providing a simulated center pipe body, for constructing a simulated environment of the center pipe body being filled with drilling fluid or clean water; providing a simulated coring barrel, for drilling for and retaining a core sample, wherein the simulated coring barrel is provided at its bottom with a connecting rod which is connected to a sealing cover body for simulating the actual state of the coring barrel being hung and lifted, the simulated coring barrel is provided at its bottom with an elastic supporting body, the connecting rod is used to simulate the actual state of the coring barrel being hung and lifted, and the elastic supporting body is used to support and fix the core sample inside the simulated coring barrel; providing a gas injection control and recovery module, for gas injection, pressurization and vacuuming inside the simulated center pipe body; providing a liquid injection control and recovery module, for injecting water or simulated drilling fluid into the simulated center pipe body to construct a simulated drilling fluid or clean water environment inside the simulated center pipe body, and for removing and recovering the remaining liquid from the simulated center pipe body after the simulation is completed; providing a drainage and gas collection metering module, for metering the drainage and gas collection of the gas-water mixed fluid discharged from the simulated center pipe body;

determining a reservoir pressure, a reservoir temperature, a drilling and coring depth, a bottom hole pressure, a bottom hole temperature and a core lift time, based on existing geological evaluation data;

selecting a large rock sample to drill for a core sample and performing a gas tightness check of the testing device;

constructing a simulated liquid-phase filling environment before the wireline coring to determine the total occurrence amount of methane gas in the core sample; and simulating the coordinated change process of liquid-phase pressure and temperature in lifting the core to a wellhead, to calculate the gas loss amount and the gas loss ratio in a simulated process of the core sample arriving at the wellhead;

wherein, the step of selecting a large rock sample to drill for a core sample and performing a gas tightness check of the testing device, comprises the following steps:

selecting a large rock sample, using the simulated coring barrel to drill into the large rock sample for the core sample, and then retaining the core sample in the simulated coring barrel, and placing the simulated coring barrel into the simulated center pipe body, with the connecting rod at the bottom of the simulated coring barrel connected to the sealing cover body, and with the core sample inside the suspended inverted simulated coring barrel in contact with the elastic supporting body at the bottom of the simulated center pipe body; using the sealing cover body to seal the simulated center pipe body, and connecting pipelines; and turning on the programmable temperature control constant temperature module, setting a test temperature to the reservoir temperature level, turning on the gas injection control and recovery module to inject helium gas into the simulated center pipe body at a pressure level 1 to 2 MPa higher than the reservoir pressure, and turning off the gas injection control and recovery module with standing for 12 to 24 hours, and checking the gas tightness of the testing device;

wherein, the step of constructing a simulated liquid-phase filling environment before the wireline coring to determine the total occurrence amount of methane gas in the core sample, comprises the following steps:

turning on the gas injection control and recovery module to continuously vacuum the testing device for 6 to 12 hours;

injecting methane gas into the simulated center pipe body at a constant pressure through the gas injection control and recovery module, and then, turning off the gas injection control and recovery module; until a second pressure gauge has been having a stable reading without change for 6 to 12 hours, recording readings of a gas mass flow meter and the second pressure gauge to determine the cumulative methane gas injection amount $C_{g1}$ and the balanced system pressure $P_1$;

starting the liquid injection control and recovery module to inject simulated formation water into the simulated center pipe body at a constant low injection rate, and continuously recording pressure changes inside the simulated center pipe body through the second pressure gauge; after the reading of the second pressure gauge reaches the reservoir pressure, the liquid injection control and recovery module changing to continue to inject the simulated formation water into the simulated center pipe body 2 at a constant pressure until the reading of the second pressure gauge does not change significantly within 12 to 24 hours;

setting the test temperature of the programmable temperature control constant temperature module to the bottom hole temperature, setting the pressure level of a program-controlled constant pressure valve to the bottom hole pressure, the liquid injection control and recovery module continuing to inject the simulated drilling fluid into the simulated center pipe body at a constant pressure higher than the bottom hole pressure, separately metering the cumulative discharge amount of methane gas through the drainage and gas collection metering module; when the metered value of the cumulative methane gas discharge amount $C_{g2}$ has no significant change within 3 to 6 hours, considering that at this time the free gas has been completely discharged from the simulated center pipe body, and determining that the core sample inside the simulated center pipe body reaches the underground temperature and pressure conditions and the occurrence state during drilling and coring in the environment of the pipe body being filled with drilling fluid; and turning off the drainage and gas collection metering module, and the liquid injection control and recovery module; until the reading of the second pressure gauge has no significant change within 12 to 24 hours, calculating the total occurrence amount of methane gas in the core sample with the following formula:

$$C_g = C_{g1} - C_{g2} \tag{1}$$

where $C_g$ is the total occurrence amount of methane gas in the core sample, measured in $cm^3$;

wherein, the step of simulating the coordinated change process of liquid-phase pressure and temperature in lifting the core to a wellhead, to calculate the gas loss amount and the gas loss ratio in a simulated process of the core sample arriving at the wellhead, comprises the following steps:

setting the automatic descent path of a simulated lift pressure from the bottom hole pressure to a wellhead pressure and the synchronous automatic descent path of a simulated temperature from the bottom hole temperature to a wellhead temperature, according to the core lift time;

adjusting the liquid outlet pressure level according to the set descent path of the simulated lift pressure, adjusting the temperature level inside the simulated center pipe body according to the set synchronous automatic descent path of the temperature, to reproduce dynamic changes in pressure and temperature conditions inside the coring barrel during the wireline coring and lifting process; and then, recording the changes in fluid pressure at the liquid outlet with time through a first pressure gauge, recording the changes in fluid pressure inside the simulated center pipe body with time through the second pressure gauge, and separately metering changes in the total amount of discharged methane gas with time through the drainage and gas collection metering module; until the program-controlled constant pressure valve and the programmable temperature control constant temperature module synchronously reach the simulated wellhead pressure and wellhead temperature conditions, recording the total amount $C_{g3}$ of discharged methane gas separately metered by the drainage and gas collection metering module, and calculating the gas loss amount and the gas loss ratio in the simulated process of the core sample arriving at the wellhead with the following formulas:

$$C_{gl} = C_{g3} - C_{g2} \tag{2}$$

$$R_{gl} = \frac{C_{g3} - C_{g2}}{C_{g1} - C_{g2}} \tag{3}$$

where $C_{gl}$ is the gas loss amount in the core sample, measured in $cm^3$; $R_{gl}$ is the gas loss ratio in the core sample.

2. A device for testing the gas loss amount which simulates a wireline coring process according to the method according to claim 1, characterized in that the simulated center pipe body is provided with a sealing cover body which is provided with a gas injection pipe hole and a liquid outlet pipe hole respectively, the sealing cover body is connected to the connecting rod, and the simulated center pipe body is provided with a drainage pipe hole at its bottom.

3. The device according to claim 2, characterized in that the simulated coring barrel adopts a diamond water drill coring bit with a certain inner diameter and outer diameter.

4. The device according to claim 3, characterized in that the gas injection control and recovery module is connected to a gas injection valve through a first pipeline, and the first pipeline is provided with a gas mass flow meter, which is used to meter the cumulative gas injection amount into the simulated center pipe body.

5. The device according to claim 3, characterized in that the drainage and gas collection metering module is connected to a program-controlled constant pressure valve through a second pipeline, and the second pipeline is provided with a first pressure gauge, which is used to monitor the outlet fluid pressure.

6. The device according to claim 3, characterized in that the drainage pipe hole is connected to a liquid injection valve through a third pipeline, and the third pipeline is provided with a second pressure gauge, which is used to monitor changes in fluid pressure inside the simulated center pipe body in real time.

* * * * *